J. DICK.
Sewing Machine.
No. 26,816.
Patented Jan 10, 1860
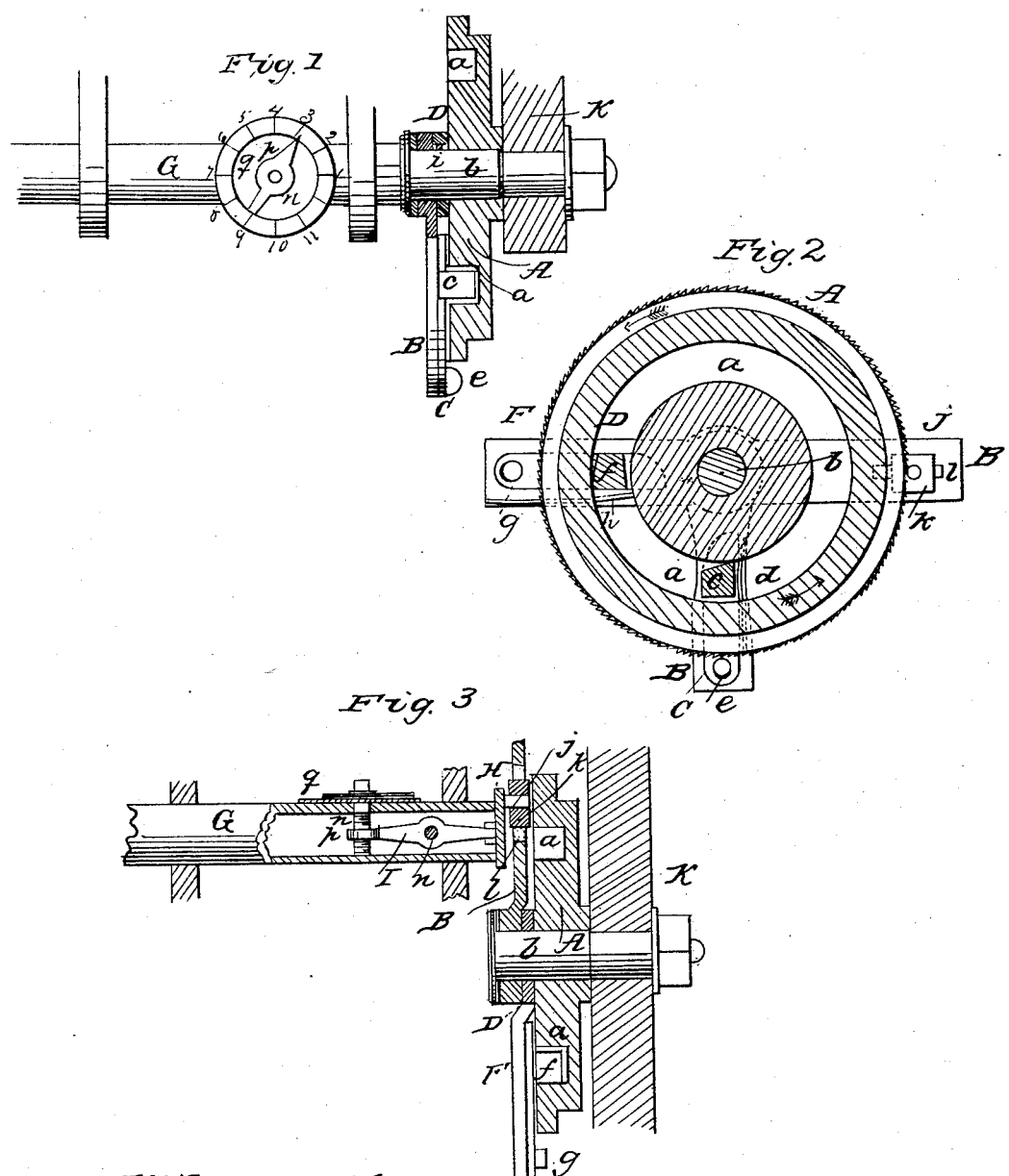
Witnesses
Rich Hughes
L. M. Hughes.
Inventor
John Dick

UNITED STATES PATENT OFFICE.

JOHN DICK, OF NEW YORK, N. Y., ASSIGNOR TO HIMSELF AND S. C. HILLS, OF SAME PLACE.

IMPROVEMENT IN SEWING-MACHINES.

Specification forming part of Letters Patent No. 26,816, dated January 10, 1860.

*To all whom it may concern:*

Be it known that I, JOHN DICK, of the city, county, and State of New York, have invented a new and useful Improvement in Mechanism for Operating the Feed-Wheels of Sewing-Machines; and I do hereby declare that the following is a full, clear, and exact description of the same, reference being had to the accompanying drawings, forming part of this specification, in which—

Figures 1 and 2 are vertical sections at right angles to each other of the feeding apparatus of a sewing-machine. Fig. 3 is a horizontal section of the same.

Similar letters of reference indicate corresponding parts in the several figures.

My invention consists in a novel mode of applying two dogs, the one to move and the other to prevent the backward movement of the feed-wheel, whereby the necessity of the application of a friction-brake to the said wheel is dispensed with, and the said wheel, though secured against any tendency to turn the wrong way, is permitted to turn in the right direction with very little friction.

It also consists in certain novel and very convenient means of regulating the feed movement, whereby it may be adjusted, before commencing to operate the machine, to produce any length of stitch that may be required.

To enable others skilled in the art to make and use my invention, I will procede to describe its construction and operation.

A represents the feed-wheel, having a square groove, $a$ in one side, and fitted to turn freely on a fixed horizontal pin or axle, $b$, which is secured in a hanger, K, below the bed, or any other suitable stationary part of the machine.

B B′ is a lever fitted to swing on the shaft or axle $b$, and having a lever-like dog, C, attached to the outer extremity of its arm B by a pin, $e$. The tooth $c$ of this dog is so fitted to the groove $a$, and so controlled by a spring, $d$, attached to the lever, that when the lever moves in the direction of the arrow shown in Fig. 2, in which the wheel is desired to move it (the said tooth) is journaled between the sides of the groove and caused to turn the wheel along with the lever; but that when the lever is moved in the opposite direction, it (the said tooth) will slide in the groove $a$ with scarcely any friction.

D is an arm, secured to the pin or shaft $b$ in such a manner as to prevent its turning by a key, $i$, Fig. 1, or its equivalent, and having a dog, F, precisely like C, attached by a pin, $g$, to its outer extremity, said dog F having a tooth, $f$, precisely like the tooth $c$, fitted to a groove, $a$, of the wheel, and having a spring, $h$, just like $d$, applied to it in precisely the same manner as the latter is applied to the dog C. This dog F allows the wheel to be moved in the direction of the arrow shown in Fig. 2, with scarcely any friction; but prevents the wheel being moved in the opposite direction by jamming between the sides of the groove $a$ as soon as any force is applied to the wheel to turn it in that direction. The holes in the dogs which receive the pins $e$ and $g$ are elongated, as shown in Fig. 2, to allow the necessary movement.

G is a shaft arranged parallel with the axis of the feed-wheel A, and having attached to one end a crank, H, whose wrist J is received in a box, $k$, that is fitted to slide in a slot, $l$, in the arm B′ of the lever B B′. The revolution of the wrist $j$ with the shaft G causes the box $k$ to slide in the slot $l$, and the lever to receive a vibratory motion on the pin or axle $b$, and so to turn the feed-wheel. To provide for a variable movement of the lever and the desirable variation of the feed, the crank H is fitted to slide in a dovetail groove in the end of the shaft G, and the said shaft is made hollow for a portion of its length, as shown in Fig. 3, to receive a lever, I, which works on a fulcrum-pin, $m$, which is inserted through the shaft. One end of the said lever is attached to the sliding crank H, and the other carries a nut, $p$, that is fitted to a screw, $n$, which is inserted across the shaft perpendicularly to the fulcrum-pin $m$, the said screw being so applied as to be incapable of moving endwise, and that by turning it it may be made to move the lower end, and so adjust the crank to give its wrist more or less throw, and so cause it to produce a greater or less movement of the lever B B′ and feed-wheel, and the pitch of the said screw being such that a single revolution of it may be sufficient to produce all the variation of throw of the crank that may be necessary to produce the greatest required variation in the length of stitch. The screw is furnished outside of the shaft G with an index, and at the back of this index a dial, $q$, is secured to the shaft, said dial being graduated in such a manner as to enable the index to show upon it the number of stitches to the inch that will be produced by the adjustment of the screw, or to show by any other system the size of stitch that will be produced. The shaft G may be the driving-shaft of the the machine, or a shaft applied for the special purpose of driving the feed, and receiving rotary motion from the driving-shaft at the same velocity.

An important feature in the application of the feeding-dog C and the retaining-dog F consists in their both being connected with the axle of the feed-wheel in such a manner that the wheel and both dogs can be applied very conveniently to any machine, all being put in place together. The advantage of the use of a retaining-dog, over the use of a friction-brake to prevent the return of the feed-wheel consists in the comparative freedom from friction with which the wheel can be moved by the feeding-dog to move the cloth.

Instead of the dogs being applied to work in a groove in the feed-wheel, the dogs may be grooved and applied to work on a projecting rim provided on the feed-wheel.

What I claim as my invention, and desire to secure by Letters Patent, is—

1. The combination of a feeding-dog attached to a lever working on a fixed axle on which the feed-wheel rotates, and a retaining-dog carried by an arm rigidly secured to the said axle, substantially as herein described.

2. The combination, with the lever which carries the feeding-dog, of a crank, H, applied to slide across the end of a hollow shaft, G, a lever, I, applied within the said shaft, and connecting the said crank with a screw arranged transversely to the said shaft, and an index attached to the said screw outside of a dial attached to the exterior of the said shaft, the whole applied and operating substantially as described, for the purpose herein set forth.

JOHN DICK.

Witnesses:
  CHS. M. HUGHES,
  MICHAEL HUGHES.